Patented June 21, 1949

2,473,802

UNITED STATES PATENT OFFICE 2,473,802

PREPARATION OF 2,4,5-TRIAMINO-6-HYDROXYPYRIMIDINE

Erwin Kuh, New Brunswick, and Hugh S. Barnaby, Bound Brook, N. J., assignors to American Cyanamid Company, New York, N. Y., a corporation of Maine No Drawing. Application September 20, 1946, Serial No. 698,396

6 Claims. (Cl. 260—251)

1

This invention relates to an improved process of preparing 2,4,5-triamino-6-hydroxypyrimidine. The invention also includes new compounds which may be formed during the process.

The known compound 2,4,5-triamino-6-hydroxypyrimidine has recently become of considerable commercial importance because of its utility as an intermediate in the preparation of pteroylglutamic acid and other therapeutically active substances. Previously known methods of making this compound were not suited to large scale production and, in some cases, the product, so obtained, could not be used in some chemical reactions without further treatment. The reduction of the nitroso group of 2,4-diamino-5-nitroso-6-hydroxypyrimidine by the use of hydrosulfites has been described but the product is a very insoluble sulfurous acid salt which cannot be used as such in reactions which must be conducted under oxidizing conditions. 2,4,5-triamino-6-hydroxypyrimidine has also been produced by reduction of the corresponding 5-nitroso pyrimidine with sulfides. In this case, however, free sulfur is liberated from the reaction mixture and must be separated from the insoluble product before it can be used in most processes. Other disadvantages associated with previously known processes of preparing this compound could also be mentioned.

The principal object of the present invention is to provide a simple, efficient and inexpensive process of preparing 2,4,5-triamino-6-hydroxypyrimidine which is easily adaptable to commercial production. The new process gives good yields of a product which can be used directly in the production of pteroylglutamic acid and other organic compounds.

In accordance with the process of the present invention, 2,4-diamino-5-nitroso-6-hydroxypyrimidine is treated with aqueous ammonia and zinc dust under conditions such that the 5-nitroso group is reduced to an amino radical. Obviously, the conditions of the reaction are subject to some variation. We prefer to use from 2 to 4 parts by weight of 28% ammonium hydroxide solution (or equivalent) for each part of the nitroso compound. The use of less ammonia would result in incomplete reduction and more ammonia would be wasted. The optimum usage of zinc dust is about 1.1 parts by weight to 1 part by weight of the nitroso compound. More zinc dust does not harm the reaction but increases the usage of acid in the purification procedure. The temperature of the reduction is not critical in that it may range from about 45° to 90° C.

2

The reaction is usually carried out with the reactants suspended in water, the amount of water not being critical but being limited by the fact that the final products are not quite insoluble in the mother liquor and at higher dilutions it is not possible to precipitate all of the product from solution.

An important feature of the process is that the easily oxidized 2,4,5-triamino-6-hydroxypyrimidine is recovered without serious oxidation by direct acidification of the reduction liquor. This results in immediate precipitation of a more stable acid salt of the product. Suitable acids for this purpose include the common acids such as sulfuric, hydrochloric, phosphoric, and the like. The acid salts can be filtered from their mother liquor, washed, dried, and stored until ready for use.

If desired, the free triamine base can be separated from a solution of one of its acid salts by merely raising the pH of the solution above 7. The substantial amount of triamine which remains in solution can be recovered by conversion to a more insoluble acid salt by treatment with an acid.

A particularly useful product which appears to be a new chemical compound can be obtained from the reaction mixture by strongly acidifying the reduction liquor with hydrochloric acid and then raising the pH to about 5. The strong acid converts the zinc to zinc chloride and the triamine to the very soluble dihydrochloride salt. By adjusting the pH to the strongly acid liquor to about 5 with a mild alkali a very insoluble complex between the zinc chloride and the 2,4,5-triamino-6-hydroxypyrimidine is formed and precipitated with a very excellent yield. The insolubility of this zinc-triamine complex makes it possible to purify the product to a high degree with good yields. After purification the zinc complex is easily converted back to the triamine hydrochloride salt, or other acid salt, by treatment with strong acids.

To illustrate the process to better advantage the following examples are given. All parts are by weight unless otherwise specified. It will be understood, of course, that the examples are intended to illustrate but not limit the invention.

Example 1

200 cc. of 28% ammonium hydroxide and 600 cc. of water are mixed and 100 g. of zinc dust is added with stirring. The slurry is heated to 55° C. and 50 g. of 2,4-diamino-5-nitroso-6-hydroxypyrimidine is slowly added. The temperature rises to about 65° C. and is kept at this temperature during the entire addition. After an almost colorless solution is obtained the excess ammonia is stripped off by gradual application of a vacuum. The warm solution is then decanted or filtered from the excess zinc into 50% sulfuric acid. 2,4,5-triamino-6-hydroxypyrimidine sulfate precipitates immediately to form large, colorless crystals.

*Example 2*

A slurry of 2.7 parts of 28% ammonium hydroxide solution, 1.1 parts of zinc dust and 10 parts of water is heated to 50° C. and 1 part of 2,4-diamino- 5 -nitroso- 6 -hydroxypyrimidine is added slowly. The temperature rises to about 65° C. and, after the reaction is complete, the excess ammonia is removed at 60° C. under vacuum. The reaction is then cooled to 40° C. and concentrated hydrochloric acid is added to a pH of about 1.5–2. The solution is clarified by filtration or decantation and 7.5 parts of concentrated sulfuric acid is added for each 100 parts per volume of the liquor. The solution is cooled to 10° C. and filtered to recover 2,4,5-triamino-6-hydroxypyrimidine sulfate. The mono-hydrate is obtained when the crystals are dried at from 50 to 60° C. and the anhydrous form is obtained upon drying at 100° C.

*Example 3*

The process of the preceding example is repeated with the exception that the solution of the reduced nitroso compound is treated with strong hydrochloric acid instead of sulfuric acid. After filtration the pH of the solution is carefully adjusted with sodium bicarbonate to about 5.0, at which an insoluble zinc-triamine complex is precipitated in the form of beautiful white crystals. Analysis of the product for chlorine, zinc and water agrees very well with the following formula:

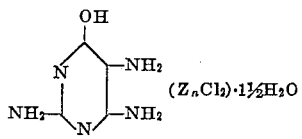

The product decomposes without melting when heated.

*Example 4*

The above described double compound can be made in an especially pure form by mixing a solution of 2.1 parts of the triamine dihydrochloride in 10 parts of water with a solution of 1.4 parts of zinc chloride in 5 parts of water and adding an excess of a concentrated sodium acetate solution. The 2,4,5-triamino-6-hydroxypyrimidine-zinc chloride double compound precipitates in white crystals; they are washed with cold water and dried. Yield nearly quantitative.

We claim:

1. A method which comprises subjecting 2,4-diamino-5-nitroso-6-hydroxypyrimidine to the action of the zinc dust and ammonium hydroxide whereby the nitroso radical is reduced to an amino radical and thereafter acidifying the reduction liquor to precipitate an acid salt of 2,4,5-triamino-6-hydroxypyrimidine and recovering said acid salt.

2. A method which comprises treating 2,4-diamino-5 - nitroso - 6 - hydroxypyrimidine with aqueous ammonium hydroxide and zinc dust whereby the nitroso radical is reduced to an amino radical, thereafter acidifying the reduction liquor with hydrochloric acid, and then adjusting the pH of the solution to about 5 whereby a precipitate of a zinc chloride-2,4,5-triamino-6-hydroxypyrimidine complex is precipitated from solution and recovering said complex.

3. The compound having the formula:

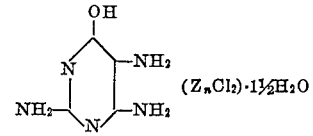

4. A method which comprises subjecting 1 part by weight of 2,4-diamino-5-nitroso-6-hydroxypyrimidine to the action of about 1.1 parts by weight of zinc dust and 2 to 4 parts by weight of 28% ammonium hydroxide while suspended in an aqueous medium whereby the nitroso radical is reduced to an amino radical and thereafter acidifying the reduction liquor to precipitate an acid salt of 2,4,5-triamino-6-hydroxypyrimidine and recovering said acid salt.

5. A method which comprises subjecting 1 part by weight of 2,4-diamino-5-nitroso-6-hydroxypyrimidine to the action of about 1.1 parts by weight of zinc dust and 2 to 4 parts by weight of 28% ammonium hydroxide while suspended in an aqueous medium whereby the nitroso radical is reduced to an amino radical and thereafter acidifying the reduction liquor with hydrochloric acid to precipitate a hydrochloride salt of 2,4,5-triamino-6-hydroxypyrimidine and recovering said acid salt.

6. A method which comprises subjecting 1 part by weight of 2,4-diamino-5-nitroso-6-hydroxypyrimidine to the action of about 1.1 parts by weight of zinc dust and 2 to 4 parts by weight of 28% ammonium hydroxide while suspended in an aqueous medium whereby the nitroso radical is reduced to an amino radical and thereafter acidifying the reduction liquor with sulfuric acid to precipitate a sulfate salt of 2,4,5-triamino-6-hydroxypyrimidine and recovering said acid salt.

ERWIN KUH.
HUGH S. BARNABY.

REFERENCES CITED

The following references are of record in the file of this patent:

FOREIGN PATENTS

| Number | Country | Date |
|--------|---------|------|
| 15,706 | Great Britain | Sept. 21, 1901 |

OTHER REFERENCES

Chemical Abstracts, 38, 58398 (1944).